United States Patent [19]

McWhinnie et al.

[11] 4,233,070
[45] Nov. 11, 1980

[54] LEAD ALLOYS FOR ELECTRIC STORAGE BATTERY

[75] Inventors: John McWhinnie, Bolton; John L. Dawson, Swinton, both of England

[73] Assignee: Chloride Group Limited, London, England

[21] Appl. No.: 41,710

[22] Filed: May 23, 1979

[30] Foreign Application Priority Data

May 26, 1978 [GB] United Kingdom ............... 22886/78

[51] Int. Cl.$^2$ ............................................ H01M 35/04
[52] U.S. Cl. ................................. 75/167; 75/166 C; 429/245
[58] Field of Search ............... 75/167, 166 C; 429/245

[56] References Cited

U.S. PATENT DOCUMENTS

| | | | |
|---|---|---|---|
| 1,703,212 | 2/1929 | Shoemaker | 75/167 |
| 1,804,883 | 5/1931 | Mathesius et al. | 75/167 |
| 1,916,496 | 7/1933 | Shoemaker | 75/167 A |
| 2,031,486 | 2/1936 | Kirebom | 75/1 |
| 2,142,835 | 1/1939 | Betterton et al. | 75/167 |
| 2,159,124 | 5/1939 | Betterton et al. | 75/167 |
| 2,210,504 | 8/1940 | Shoemaker | 75/167 A |
| 2,794,707 | 6/1957 | Walsh | 75/167 |
| 2,860,969 | 11/1958 | Walsh | 75/167 |
| 3,920,473 | 11/1975 | Sims | 136/65 |
| 4,125,690 | 11/1978 | Bagshaw et al. | 429/226 |

FOREIGN PATENT DOCUMENTS

1084926 7/1960 Fed. Rep. of Germany ............ 75/167

*Primary Examiner*—L. Dewayne Rutledge
*Assistant Examiner*—Upendra Roy
*Attorney, Agent, or Firm*—Oblon, Fisher, Spivak, McClelland & Maier

[57] ABSTRACT

A lead alkaline earth metal alloy comprising lead, calcium, barium or strontium or mixtures thereof in an amount of 0.075A/40% to 0.13A/40% by weight where A is the atomic weight of alkaline earth metal 0.005% to 0.05% magnesium and preferably 0.005% to 0.01% aluminium is disclosed and has improved corrosion resistance combined with tensile strength as compared to alloys with magnesium and aluminium contents outside these defined ranges.

The alloy is useful for grids in lead acid electric storage batteries.

8 Claims, No Drawings

LEAD ALLOYS FOR ELECTRIC STORAGE BATTERY

BACKGROUND OF THE INVENTION

1. Field of the Invention

The present invention relates to lead alloys. These are particularly useful in electric storage batteries in particular for use in the production of cast grids or other support structures for the active material of the electrodes which may be fabricated for such uses by conventional processes such as rolling. The invention is also applicable to electrodes for use in electrolysis cells.

The alloys are also applicable to electrodes in electrolysis cells for producing chemicals, electrowinning and electro-refining of metals, plating baths, to sheathing and cladding to protect articles such as cable and chemical plant and can be fabricated for such uses by conventional processes such as casting, extrusion and rolling.

2. The State of the Prior Art

The specification of British Pat. No. 712798 discloses lead-calcium and lead-tin-calcium alloys containing aluminium as an antidrossing agent. The presence of aluminium reduces the oxidation rate of the bulk of the molten metal and minimizes the loss of alloying element.

This earlier specification discloses an alloy containing 0.08% by weight calcium, 1.5% by weight tin, 0.05% by weight aluminium and 98.37% by weight lead. It also teaches that alloys having 0.03% to 0.1% calcium, 1% to 2% by weight tin, 0.01% to 0.1% aluminium, balance being lead and impurities, have superior properties. We have found however that at calcium contents below 0.075% the material is insufficiently hard within acceptable periods of time to be mechanically trimmed and in addition the corrosion of the alloy is greater as the tin content increases above 1%.

Lead-tin-calcium alloys have many excellent properties for use in electric storage battery electrodes but they suffer from reluctance to recharge and this is referred to as poor rechargeability.

SUMMARY OF THE INVENTION

We have found that by the use of selected proportions of magnesium and aluminium, alloys having improved charge acceptance on cycling are obtained.

Thus according to one aspect of the present invention a lead-alkaline earth metal alloy comprises 0.075A/40% to 0.13A/40% by weight alkaline earth metal or mixtures thereof preferably 0.08A/40% to 0.10A/40% and more preferably 0.08A/40% to 0.09A/40% alkaline earth metal, preferably 0.005% up to less than 1.0% by weight tin, preferably 0.005% to 0.99% by weight and more preferably 0.1% to 0.8% and especially 0.4% to 0.7% tin, 0.0001% to 0.1%, more preferably 0.0005% to 0.05% e.g. 0.005% to 0.01% aluminium, 0.005% to 0.05% preferably 0.007% to 0.025% more especially 0.008% to 0.02% by weight magnesium, the balance being lead and impurities, the alkaline earth metal being calcium, strontium or barium and A being the atomic weight of the alkaline earth metal.

Alloys of this defined composition are very suitable for casting into the shape of current conducting grids for lead acid electric storage batteries. The invention also extends to grids made from such alloys.

The invention may be put into practice in various ways and a number of specific embodiments will be described to illustrate the invention with reference to the accompanying examples.

DETAILED DESCRIPTION OF THE INVENTION

EXAMPLES 1–12

12 Alloys were made up by adding calcium and aluminium (except in Examples 1–4) simultaneously to molten lead at 590° C. Magnesium and tin were later added when the melt had cooled to 400° and 350° respectively. The compositions of the additions to the melt were given in Table 1.

TABLE 1

| Example | Calcium | Tin | Magnesium | Aluminium |
|---|---|---|---|---|
| 1 | 0.085 | 0.7 | 0.0004 | 0 |
| 2 | 0.085 | 0.7 | 0.005 | 0 |
| 3 | 0.085 | 0.7 | 0.02 | 0 |
| 4 | 0.085 | 0.7 | 0.10 | 0 |
| 5 | 0.085 | 0.7 | 0.0004 | 0.005 |
| 6 | 0.085 | 0.7 | 0.005 | 0.005 |
| 7 | 0.085 | 0.7 | 0.02 | 0.005 |
| 8 | 0.085 | 0.7 | 0.10 | 0.005 |
| 9 | 0.085 | 0.7 | 0.0004 | 0.01 |
| 10 | 0.085 | 0.7 | 0.005 | 0.01 |
| 11 | 0.085 | 0.7 | 0.02 | 0.01 |
| 12 | 0.085 | 0.7 | 0.10 | 0.01 |

The alloys were cast into a mould to produce 1.40 cm diameter rods for subsequent extrusion.

The cast bars were cut into 6 cm lengths before fitting into a preheated extrusion die. The die was electrically heated by a split ring heater to 150° C. prior to extrusion. Pressure was applied to the extrusion die after placing it between the plattens of an Ajax metallurgical mounting press. The extruded rod was supported as it emerged from the die by a 100 cm long narrow diameter tube to prevent 'kinking'. The diameter of the extruded rod was 2.5 mm. Electrodes 12 cm long were cut from the rod and annealed at 100° C. for one week. Screened copper cable 0.7 mm diameter was soldered to the electrode for electrical connection. A predetermined length of 5.5 cm was measured on the electrode and the remainder was protected from corrosion attack by epoxy resin cast inside a 6 mm diameter glass tube containing the screened wire. The wire was further protected from attack by electrolyte by polythene tubing fitted tightly over the glass tubing. The electrodes were used for anodic weight loss studies, the results of which are given in Table 2.

The corrosion tests for Table 2 were carried out at 30° C. in 5 M sulphuric acid saturated with nitrogen gas, at a constant potential of 1500 mV against a mercury/mercurous sulphate reference electrode.

The potentiostatic corrosion tests involved electrolysis for 4 weeks with the weighed samples (W1) as the anode. The sample electrodes at the end of the corrosion test were withdrawn, washed with water, then acetone and dried in a stream of warm air. These electrodes then had the corrosion products removed by immersion at ambient temperature for ½ hour in a stripping solution prepared from:

| Hydrazine Dihydrochloride | 100g |
|---|---|
| Ammonium Acetate | 150g |
| Glacial Acetic Acid | 40g |
| Water | 1 Liter. |

The stripped samples were then washed, dried and reweighed, (W2). The weight loss quoted (W1−W2) was then converted and expressed as mg/cm$^2$.

TABLE 2

| Example | Anodic weight loss mg/cm$^2$ at 1500 mV and 30° C. after 4 weeks. (Average of two results). | Tensile strength Kg/mm$^2$ (1) |
| --- | --- | --- |
| 1 | 13 | 4.95 |
| 2 | 31 | 5.15 |
| 3 | 65 | 5.95 |
| 4 | 182 | 6.35 |
| 5 | 31 | 5.10 |
| 6 | 45 | 5.75 |
| 7 | 58 | 6.05 |
| 8 | 214 | 6.75 |
| 9 | 23 | 5.10 |
| 10 | 37 | 5.75 |
| 11 | 35 | 6.05 |
| 12 | 85 | 6.70 |

(1) Measured on a 5.08 cm gauge length sample of 1.27 cm diameter cast specimen at a straining rate of 6 mm/minute.

It will be observed that the alloys (Examples 1, 5 and 9) having a low magnesium content have an inferior strength, whilst those (Examples 4, 8 and 12) having high magnesium content have an inferior corrosion resistance.

Extruded rods of Example 1 and Example 11 of 0.1 inches diameter were then made the anode in 1.280 sp gravity sulphuric acid and subjected to 1.5 volts for 1.5 hours, the voltage was then reduced to 1.0 volts for 10 minutes and then the 1.5 volts potential reapplied for 1.5 hours, the current being measured continuously. This cycle was repeated 100 times, the peak current value observed when the potential is raised again to 1.5 volts was plotted against the cycle number. The current was significantly higher at each cycle for Example 11 than was that for Example 1.

As mentioned above, the alloy of this invention can be converted into supports for the electrodes of lead acid cells either by casting in a mould defining a grid or by cold wrought procedures. When these latter procedures are to be used, the alloy may be continuously cast as a sheet and is then preferably immediately rolled to a sheet once it has solidified or it may be given additional cooling so that it is rolled at about ambient temperature. The rolling can conveiently be carried out continuously, e.g. on the output from a chilled roll continuous sheet casting machine. In this process the interval between casting and rolling may be only a few minutes. This procedure has a desirable effect on the age hardening and strength properties of the alloy.

Alternatively, a process with separate stages of casting and rolling would incur a longer interval, e.g. 28 days, but preferably less than 7 days.

The sheet may be rolled so as to reduce its thickness to an amount of at least a half i.e. a reduction ratio of at least 2, and preferably at least 4, e.g. in the range of 2 to 20 or 4 to 10.

In the case of supports for the electrodes of lead acid cells the rolled sheet can then be punched out to the desired shape or preferably slit in rows of short spaced apart slits and then pulled either lengthwise or preferably across the length of the strip continuously to form an expanded metal mesh, in this case the rows of slits being along the length of the strip. This expanded mesh is then used as the electrode support and may be pasted with active material in conventional manner.

What is claimed is:

1. A lead alkaline earth metal alloy which consists of 0.075A/40% to 0.13A/40% by weight of at least one alkaline earth metal, 0.0001% to 0.1% aluminium, 0.005% to 0.05% by weight magnesium, the balance being lead and impurities, the alkaline earth metal being selected from the group consisting of calcium, strontium and barium and A being the atomic weight of the alkaline earth metal.

2. An alloy as claimed in claim 1 which includes 0.08A/40% to 0.09A/40% by weight alkaline earth metal.

3. An alloy as claimed in claim 1 which includes 0.0005% to 0.01% by weight of aluminium.

4. An alloy as claimed in claim 1 which includes 0.008% to 0.02% by weight magnesium.

5. An alloy as claimed in claim 1 in which the alkaline earth metal is calcium.

6. A lead alkaline earth metal alloy consisting of 0.075% to 0.13% by weight of calcium, 0.005% to 0.05% by weight magnesium and 0.005% to 0.01% aluminium, the balance being lead and impurities, the alloy having a corrosion loss of less than 85 mg/cm$^2$ of immersed surface when immersed for four weeks at 30° C. in 5 M sulphuric acid saturated with nitrogen gas as the anode against a mercury/mercurous sulphate reference electrode at a constant potential of 1500 mV.

7. An electric storage battery incorporating electrode supports made from an alloy as claimed in claim 1 or claim 6.

8. A lead alkaline earth metal alloy which consists of 0.075A/40% to 0.13A/40% by weight of at least one alkaline earth metal, 0.0001% to 0.1% aluminum, 0.005% to 0.05% by weight magnesium, 0.4 to 0.7% by weight tin, the balance being lead and impurities, the alkaline earth metal being selected from the group consisting of calcium, strontium and barium and A being the atomic weight of the alkaline earth metal.

* * * * *